United States Patent [19]
Mionet et al.

[11] Patent Number: 5,920,627
[45] Date of Patent: Jul. 6, 1999

[54] ENCRYPTION DEVICE AND DECRYPTION DEVICE FOR INFORMATION CONVEYED BY ASYNCHRONOUS TRANSFER MODE CELLS

[75] Inventors: Hubert Mionet, Clamart; Pierre Hermet, Bures Sur Yvette; Marc Dieudonne, Igny, all of France

[73] Assignee: Alcatel CIT, Paris, France

[21] Appl. No.: 08/767,872

[22] Filed: Dec. 17, 1996

[30] Foreign Application Priority Data

Dec. 18, 1995 [FR] France ................................. 95 14988

[51] Int. Cl.$^6$ ....................................... H04L 9/00
[52] U.S. Cl. ................... 380/21; 380/46; 380/49
[58] Field of Search ................... 380/46, 49, 21

[56] References Cited

U.S. PATENT DOCUMENTS 5,247,576  9/1993  Bright .................................. 380/21
5,257,311  10/1993  Naito et al. .......................... 380/46
5,442,702  8/1995  van Ooijen et al. ................. 380/49

FOREIGN PATENT DOCUMENTS

0374028A1  6/1990  European Pat. Off. .
0660570A2  6/1995  European Pat. Off. .
0664627A1  7/1995  European Pat. Off. .

*Primary Examiner*—Salvatore Cangialosi
*Attorney, Agent, or Firm*—Sughrue, Mion, Zinn, Macpeak & Seas, PLLC

[57] ABSTRACT

An encryption device can be used to encrypt information units conveyed by cells that are broadcast from an optical broadcast node to network units by a passive optical network. Each cell conveys at least one information unit and each information unit is addressed to a respective subscriber terminal. The device includes an encryption system that receives in clear at least one key from at least one decryption device located in a network unit. Applications include ATM telecommunication networks.

14 Claims, 5 Drawing Sheets

ENCRYPTION DEVICE AND DECRYPTION DEVICE FOR INFORMATION CONVEYED BY ASYNCHRONOUS TRANSFER MODE CELLS

BACKGROUND OF THE INVENTION

1. Field of the Invention

The invention concerns an encryption device and a decryption device for information conveyed by asynchronous transfer mode cells. They enable an encrypted service to be offered in a telecommunication network in which cells are transmitted from a node towards network units using a point-to-multipoint or node to network units broadcast technique. The invention is applicable in particular in a telecommunication network including at least one optical access node connected to at least one passive optical network.

2. Description of the Prior Art

FIG. 1 shows the block diagram of one embodiment of a telecommunication network branching point of this kind. It includes: an optical access node OAN and passive optical networks. FIG. 1 shows by way of example a single passive optical network APON connected to a plurality of network units ONU1, ONU2, ONU3, ONU4 and subscriber terminals ST1, . . . , ST12. The optical access node OAN is connected to other nodes of a telecommunication network by multiplexes IM1, . . . , IMp which can be 2 Mbit/s synchronous multiplexes, for example, or broadband multiplexes transmitting asynchronous transfer mode cells.

The node OAN includes a coupling device TUAN including the optical line termination function and connected by an optical fiber to a passive directional coupler DC of the network APON. Similarly, each of the units ONU1, . . . , ONU4 is connected to the coupler DC by an optical fiber. The optical fibers and the coupler DC constitute the passive optical network APON which is in the shape of a star. The coupler DC has the property of broadcasting identically to all the units ONU1, ONU2, ONU3, ONU4 the optical signals emitted by the node OAN. On the other hand, any optical signal emitted by any one of the units is routed by the coupler DC only to the node OAN, because of the directional properties of the coupler DC.

Each network unit ONU1, . . . , ONU4 is connected to one or more subscriber terminals. For example, the unit ONU1 is connected to three subscriber terminals ST1, ST2, ST3 by an optical fiber, a broadband electrical connection or a conventional narrowband electrical connection. In the latter case, the network unit includes a conventional asynchronous/synchronous and synchronous/asynchronous converter.

To use the resources of asynchronous transfer mode networks more efficiently, the use of composite cells is envisaged, each such cell conveying several units of information addressed to different subscriber terminals but conveyed in the same cell along at least part of the path.

FIG. 1 shows one example of routing a composite cell CL1 that is constructed by the coupling device TUAN from information received via the multiplexes IM, . . . , IMp. The composite cell CL1 is broadcast identically to each of the units ONU1, . . . , ONU4 by the coupler DC. Operation and maintenance messages tell the unit ONU1 that the cell CL1 contains an information unit U1 addressed to the subscriber terminal ST1 and an information unit U3 addressed to the subscriber terminal ST3, the terminals ST1 and ST3 being connected to the unit ONU1. Similarly, the unit ONU3 knows that the cell CL1 contains an information unit U2 addressed to the subscriber terminal ST7 connected to the unit ONU3. In this example the unit ONU1 extracts the two information units from the cell CL1 and forwards them in cells CL2 and CL3, respectively on an optical fiber connecting the unit ONU1 to the subscriber terminal ST1 and on an optical fiber connecting the unit ONU1 to the subscriber terminal ST3. The unit ONU3 extracts the information unit U2 from the cell CL1 and forwards it in a cell CL4 on an optical fiber connected to the terminal ST7.

In other examples, a unit forwards the information units in the form of synchronous frames on copper pairs connecting subscriber terminals to the unit.

Each information unit can be an octet of a conventional synchronous telephone circuit, identified by its position, which is constant in each cell, or a data micropacket, identified by a label at the beginning of the data micropacket.

A telecommunication network branching point of this kind has certain advantages, in particular enabling very easy broadcasting of information units addressed to all subscribers, for example for broadcasting audiovisual programs. However, it has the disadvantage that information transmitted from the broadcast node to any one of the network units is not confidential. Each network unit ONU1, . . . , ONU4 receives all the cells transmitted by the coupling device TUAN, including cells that do not contain any information unit addressed to subscriber terminals connected to the unit concerned. A subscriber who has a network unit can therefore receive all information transmitted by the coupling device TUAN. It is therefore necessary to provide means of protecting the confidentiality of information units that are not addressed to all subscriber terminals.

There are many encryption methods:

Block encryption methods consist in applying an encryption algorithm to a set of data constituting a block of given length, which makes it necessary to wait for an entire data block to be available before the data block can be encrypted. The blocks are transmitted with flags identifying the limits of each block. Consequently, it is easy to synchronize encryption and decryption. On the other hand, these methods introduce an encryption and decryption time-delay that is proportional to the block size. Further, the least transmission error can compromise the decryption of a complete block.

"On the fly" encryption methods consist in using an exclusive-OR gate to add successively each bit of the stream of binary data to be transmitted to a bit of a pseudo-random binary sequence to obtain an encrypted bit stream. Decryption consists in using an exclusive-OR gate to add successively each bit of the encrypted bit stream to a pseudo-random binary sequence identical to that used for encryption. It is essential to synchronize the pseudo-random binary sequence used for encryption and that used for decryption. Further, the synchronization of the pseudo-random sequences must be re-established quickly if it is lost because of transmission errors.

European patent application 0 374 028 describes a device for encrypting information units conveyed in composite packets that are broadcast from an optical access node to subscriber installations, each of which may be deemed to comprise a network unit and a single subscriber terminal. Each composite packet conveys a plurality of information units, each information unit being addressed to a different subscriber installation. To assure confidentiality, each information unit is encrypted. Each subscriber installation receives all the composite packets but can decrypt only the information units addressed to it.

To encrypt each information unit the node includes an on the fly encryption device which calculates an encrypted value for each bit of the information unit, according to a respective bit of a pseudo-random sequence that is dependent on the destination subscriber installation. This stream simply comprises bits of the last information unit transmitted by this subscriber installation and received without error by the node. The information units are transmitted to the node in clear since the directional nature of the coupler prevents the other subscriber installations from receiving them. The subscriber installations transmit information units that can be of any kind and therefore different from one subscriber installation to another. Each information unit received in error by the node can therefore constitute a pseudo-random sequence specific to a subscriber installation. Each subscriber installation holds in memory the last information unit that it transmitted to the node if it receives an acknowledgement indicating that transmission occurred without error. A decryption device in the subscriber unit subsequently utilizes this information unit as a pseudo-random sequence for decrypting an information unit included in the next packet transmitted by the node.

The pseudo-random sequence used by the encryption device and that used by the decryption device are synchronized because the encryption device systematically uses as the pseudo-random sequence the last information unit it has received without error and the decryption device systematically uses the last information unit that it transmitted and that was received without error by the node.

This encryption device and this decryption device have the disadvantage of being able to operate only if the bit rates are equal in both transmission directions and if there is some degree of synchronism between the transmission of information units by the node and by the subscriber installations:

If the bit rate of the information units addressed to a subscriber installation is greater than the bit rate of the information units transmitted by that installation, the encryption device sometimes lacks the information to constitute the pseudo-random sequence needed for bit by bit encryption. If the transmission of an information unit to the node is not interleaved between the transmission of two information units to the subscriber installation, the encryption device lacks information to constitute the pseudo-random sequence for encrypting an information unit.

Thus these prior art devices are not usable in practise in an asynchronous transfer mode network because one feature and one advantage of a network of this kind is precisely that it allows high variations in bit rate and asynchronous operation.

An aim of the invention is to propose an encryption device and a decryption device that are free of the above drawbacks.

SUMMARY OF THE INVENTION

In a first aspect, the invention consists in an encryption device for encrypting information units conveyed by asynchronous transfer mode cells, usable in an optical distribution network including an optical access node, a directional passive optical network and a plurality of network units, coupling means conveying to the optical access node only any cell sent by a network unit, cells being broadcast from a node to network units, each cell conveying at least one information unit, each information unit being addressed to a single network unit;

said encryption device being located in said optical access node and including:

means for calculating an encrypted value for each bit of each information unit to be encrypted, in accordance with a respective bit of a first pseudo-random sequence; and means for supplying this first pseudo-random sequence, in accordance with a key value specific to the network unit to which the information unit is addressed;

wherein the means for supplying this first pseudo-random sequence include:

means for calculating this first pseudo-random sequence using an algorithm that is difficult to reverse, in accordance with a key value; and means for receiving in clear at least one key from at least one decryption device in a network unit.

In a second aspect, the invention consists in a decryption device for decrypting information units conveyed by asynchronous transfer mode cells, usable in a directional passive optical network including an optical access node, a plurality of network units and coupling means broadcasting from the node to the network units any cell transmitted by the node and conveying to the node only any cell transmitted by a network unit, each cell conveying at least one information unit and each information unit being addressed to a single network unit;

said decryption device being located in a network unit and including:

means for calculating a decrypted value for each bit of each information unit to be decrypted, in accordance with a respective bit of a first pseudo-random sequence; and means for supplying this first pseudo-random sequence according to the network unit that includes said decryption device;

wherein the means for supplying this first pseudo-random sequence include:

means for calculating this first pseudo-random sequence using an algorithm that is difficult to reverse and in accordance with a key value; and means for supplying this key value and for sending it in clear to an encryption device located in the optical access node.

The above devices enable the same key to be supplied to the optical access node and to a network unit, the confidentiality of the key being protected by the following combination of features:

It is the decryption device that generates the key and supplies it to the encryption device.

The link in the form of a directional optical network protects the confidentiality of transmission in the optical network unit to optical access node direction.

Another object of the invention is an encryption device for composite cells each conveying a plurality of information units respectively addressed to a plurality of subscriber terminals that are separate but connected to the same network unit, wherein the first pseudo-random sequence is also conditioned by the position of this information unit in the cell which conveys it after encryption.

Another object of the invention is a decryption device for composite cells each conveying a plurality of information units addressed to a respective plurality of subscriber terminals that are separate but connected to the same network unit, wherein the first pseudo-random sequence is also conditioned by the position of this information unit in the cell which conveys it to the decryption device.

The above devices assure enhanced confidentiality because encryption is dependent on an additional variable: the position of the information unit in the cell conveying it.

In a preferred embodiment, usable in a directional passive optical network, the first pseudo-random sequence is also calculated in accordance with a second pseudo-random sequence constituting a synchronization sequence and the means for supplying the first pseudo-random sequence further include synchronization means for supplying the second pseudo-random binary sequence and for transmitting samples of this sequence to at least one decryption device in order to synchronize it.

The first pseudo-random sequence is also calculated in accordance with a second pseudo-random sequence constituting a synchronization sequence and the means for supplying the first pseudo-random sequence further include synchronization means for supplying this second pseudo-random binary sequence and for synchronizing this sequence on the basis of samples of this sequence supplied by an encryption device.

Thus the synchronization problem is solved by using two separate pseudo-random sequences: a first sequence that is very difficult to imitate and is known by only one network unit provides the resistance of encryption. A second sequence, broadcast in clear to all the network units, is used as a timing reference to produce the first sequence and a replica of the first sequence, synchronously in the encryption device and in the decryption device. It therefore initializes and maintains synchronization without the drawbacks of encryption at block level, since the data is encrypted bit by bit.

In one preferred embodiment, the means for supplying a second pseudo-random sequence supply a second sequence that is independent for each virtual circuit set up between the node and a network unit and supply this sequence at a timing rate corresponding to the rate at which cells are sent on the virtual circuit concerned.

The means for supplying a second pseudo-random sequence supply a second sequence that is independent for each virtual circuit established between the node and a network unit and supply this sequence at a timing rate corresponding to the rate at which cells are received on the virtual circuit concerned.

The above devices produce a synchronization pseudo-random sequence that is independent for each virtual circuit, each unit having at least one virtual circuit set up with the node. This enables independent synchronization for each virtual circuit. Accordingly, the timing differences between virtual circuits do not cause any problem.

In one preferred embodiment, the means for supplying a second pseudo-random sequence include a shift register looped by a logic circuit implementing a linear function and the samples supplied comprise the value contained in at least one of the stages of this shift register.

The means for supplying a second pseudo-random sequence include a shift register looped by a logic circuit implementing a linear function and samples supplied by the encryption device are loaded into at least one stage of this shift register to synchronize it.

The above devices have the advantage of synchronizing encryption and decryption by circuits that are very simple to implement.

In one preferred embodiment, the encryption device further includes means for:

memorizing a plurality of keys, deciding to change key, and inserting into each cell information indicating which key was used to encrypt the information units conveyed by that cell, and the decryption device further includes:

memory means for memorizing a plurality of keys;

means for receiving information conveyed in each encrypted cell and indicating what key was used to encrypt the information units conveyed by that cell; and means for reading in the memory means the key that is indicated by the information conveyed in a cell and supplying it to the means for supplying the first pseudo-random sequence.

The invention will be more clearly understood and other features of the invention will emerge from the following description and the accompanying drawings.

DETAILED DESCRIPTION OF THE PREFERRED EMBODIMENTS

Figure 1:
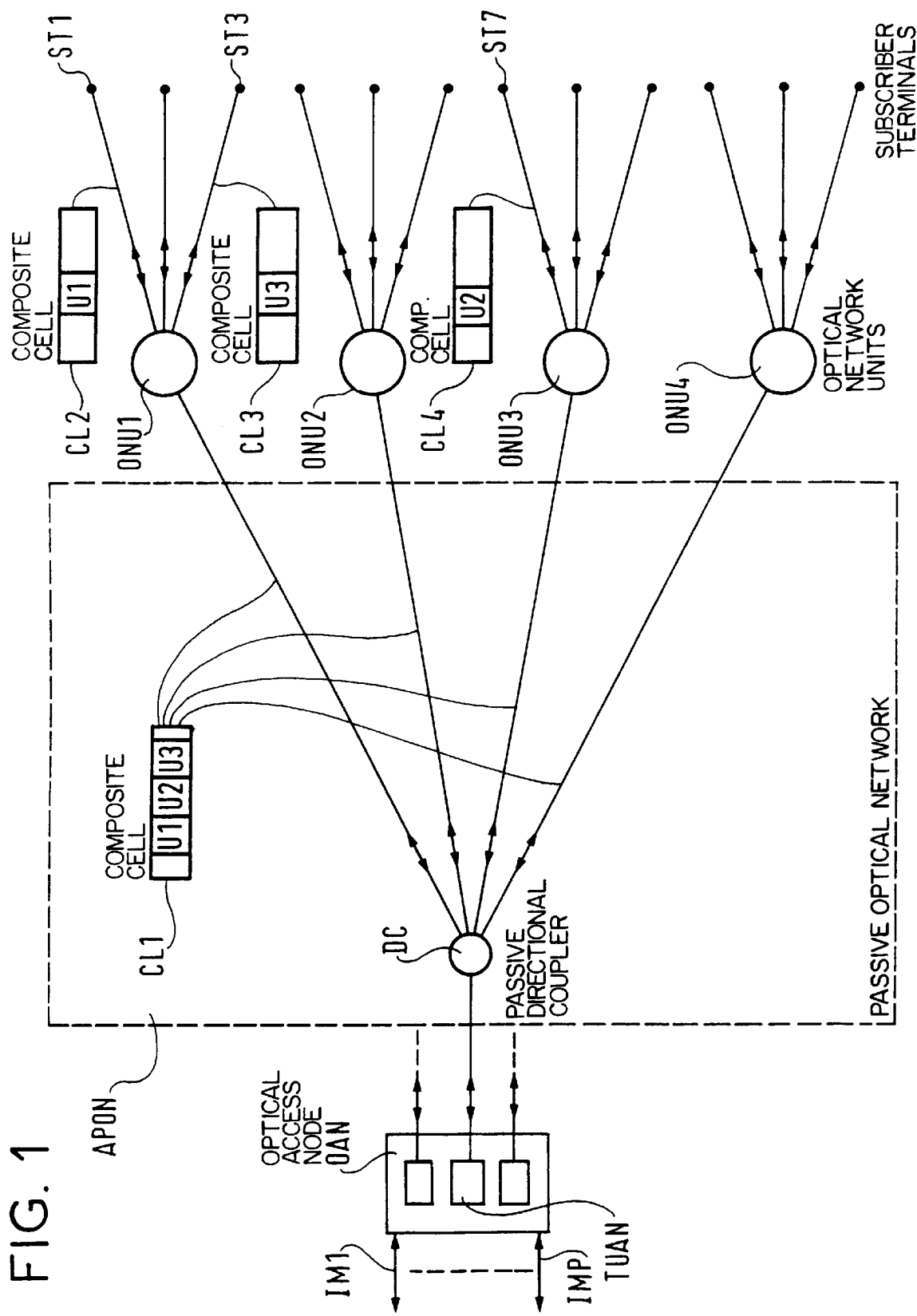
FIG. 1 shows the block diagram of a telecommunication network branching point including a passive optical network as described above.
Figure 2:
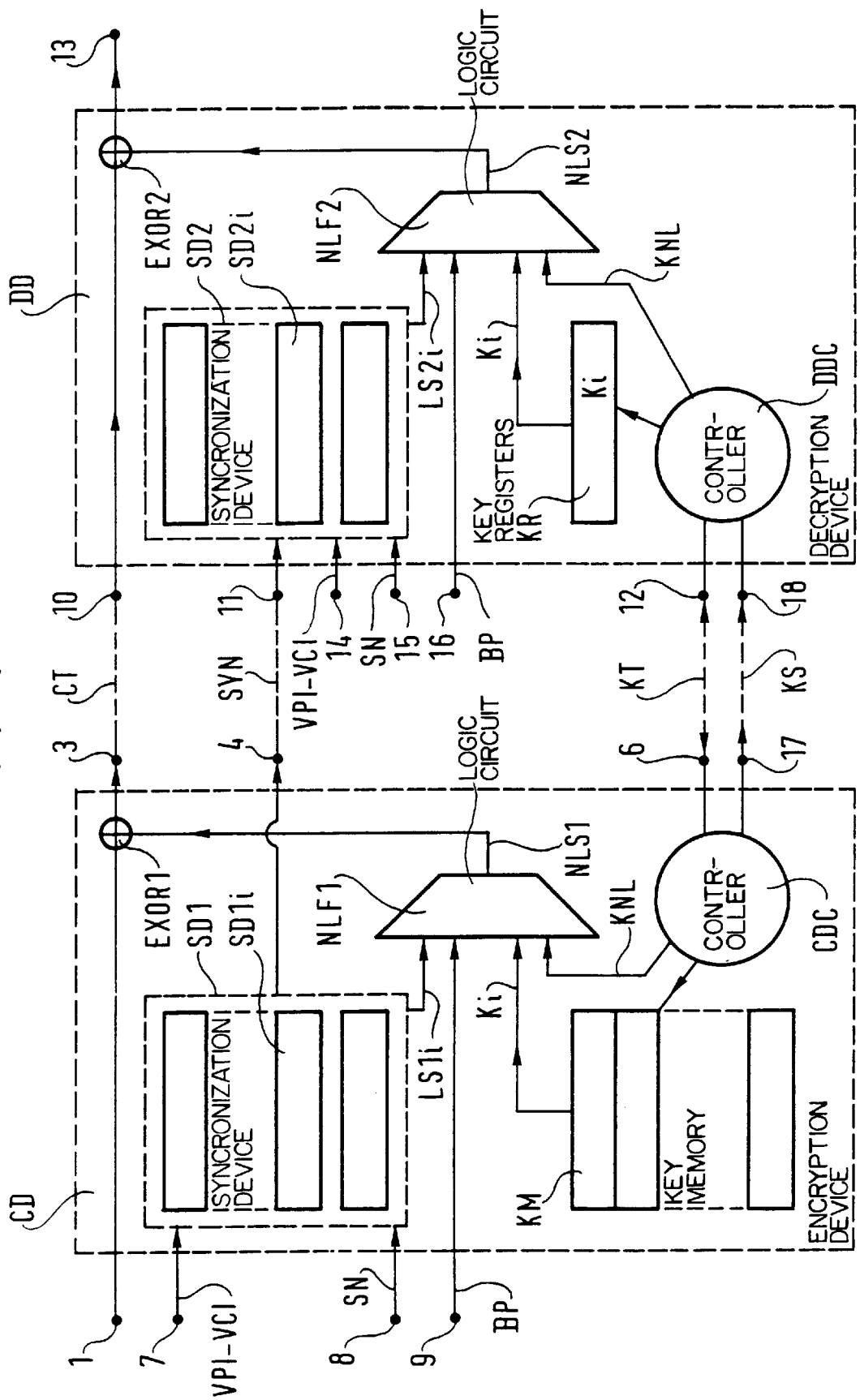
FIG. 2 shows the block diagram of one embodiment of an encryption device and a decryption device of the invention.

FIG. 2 shows the block diagram of one embodiment of the encryption device CD of the invention and one embodiment of a decryption device DD of the invention. The device CD is in the coupling device TUAN and the device DD is duplicated in each network unit ONU1, ..., ONU4. FIG. 2 does not show the physical connections between these two devices but the logical connections that are supported by the passive optical network APON. These logical connections are:

a connection CT transmitting the encrypted information units from the node to all the units;

a synchronization connection SYN transmitting samples of a synchronization pseudo-random sequence from the node to all the units;

a bidirectional connection KT transmitting messages for transferring keys and for acknowledging such transfers in both directions, there being few timing constraints on these transfers; and a high-speed connection KS for routing from the node OAN to the unit ONU1 an order to replace a current key by another key already stored in memory in the decryption device DD.

These separate logical connections are in fact supported by the same cells. A separate virtual circuit is set up to connect the node to each unit. In the node to unit direction, each cell includes a standardized header on five octets and a payload of 48 octets, the first octet of which is used for a sequence number SN incremented for each cell transmitted on a given virtual circuit and the second octet of which, or control octet, is used for service information specific to the encryption and decryption operations. The remaining 46 octets convey the information units, each of which occupies a whole number of octets.

The encryption device CD encrypts with respective different keys the information units addressed to the network units ONU1, ..., ONU4. It includes:

an input terminal 1 receiving a stream of binary data to be encrypted, which is made up of the bits of the information units of a cell to be transmitted, each information unit being the value of a telephone circuit sample or a data micropacket addressed to any one of the units ONU1, . . . , ONU4; the header bits and the service bits conveyed by the cell are not encrypted;

an input terminal 7 receiving a virtual circuit identifier VCI and a virtual path identifier VPI, these two identifiers identifying the virtual circuit supported by the cell to be transmitted and connecting the node OAN to the unit ONU1;

an input terminal 8 receiving the sequence number SN of this cell in the sequence of cells supporting this virtual circuit;

an input terminal 9 receiving a binary word BP indicating the position in this cell of the octet one bit of which is currently being encrypted and transmitted;

an output terminal 3 supplying an encrypted bit stream to the logical connection CT;

an output terminal 4 supplying samples of a synchronization pseudo-random binary sequence to the synchronization logical connection SYN;

an input-output terminal 6 receiving and transmitting key transfer and acknowledgement messages on the logical connection KT;

an output terminal 17 connected to the high-speed connection KS for sending messages commanding the use of a new key;

an exclusive-OR gate EXOR1 having a first input connected to the input terminal 1, a second input receiving a non-linear pseudo-random binary sequence NLS1 and an output connected to the output terminal 3, this gate encrypting the information units on the fly, i.e. bit by bit;

a logic circuit NLF1 implementing a logic function that is non-linear and therefore difficult to reverse, this circuit NLF1 having a first input receiving a linear pseudo-random binary sequence LS1, a second input receiving a key Ki, a third input receiving the binary word BP, a fourth input receiving a bit KNL which is the least significant bit of a key number designating the key Ki and an output supplying the non-linear pseudo-random binary sequence NLS1 bit by bit to the second input of the gate EXOR1;

a key memory KM capable of storing two key values (a key in use and a reserve key) for each of the units ONU1, . . . , ONU4 and having an output connected to the second input of the logic circuit NLF1;

a controller CDC controlling the operation of the encryption device CD as a whole and applying the key change protocol, this controller having an input-output connected to the input-output terminal 6, an output connected to an input of the key memory KM to write new keys into that memory and to command the reading of the key for each of the information units to be encrypted, an output connected to the fourth input of the logic circuit NLF1 to supply it with the bit KNL and an output connected to the output terminal 17; and a synchronization device SD1 including a plurality of pseudo-random binary sequence generators, each dedicated to a respective virtual circuit, including a generator SD1i providing the sequence LS1i for the virtual circuit identified by the identifiers VPI-VCI applied to the input terminal 7, this device SD1 having an input connected to the input terminal 7 to receive the pair of identifiers VPI-VCI, an input connected to the input terminal 8 to receive the sequence number SN, a first output supplying the linear pseudo-random sequence LS1 to the first input of the logic circuit NLF1 and a second output connected to the output terminal 4 and periodically supplying samples of the linear pseudo-random sequence LS1 for synchronizing the decryption device in a network unit through which the data currently being encrypted and transmitted must pass.

The gate EXOR1 processes the data to be encrypted bit by bit and thus without any time-delay. Each information unit includes a whole number of octets. The key Ki therefore remains the same for at least one octet. The logic circuit NLF1 therefore works octet by octet and the controller CDC changes the key Ki, possibly for each octet. The logic circuit NLF1 calculates an octet of the sequence NLS1 all at once but its output supplies it bit by bit to the second input of the gate EXOR1 at the timing rate of the bits to be encrypted.

If the passive optical network APON is intended to convey only conventional cells the content of each of which is intended to pass through a single network unit, it is naturally sufficient for the circuit NLF1 to work out the timing rate of the cells, i.e. to calculate the linear pseudo-random sequence NLS1 for blocks of 46 octets, since the standardized length of the payload of a cell is 48 octets, and two octets are used for service information.

The synchronization device SD1 includes the same number of active generators as there are virtual circuits set up between the node TUAN and the network units ONU1, . . . , ONU4. Each generator supplies a pseudo-random sequence at the timing rate of the cells supporting the virtual circuit corresponding to this generator. Each time the sequence number SN is incremented by one unit for the virtual circuit identified by VPI-VCI, the sequence supplied for that virtual circuit progresses by one bit. It is supplied in the form of a word made up of 25 consecutive bits of the sequence in parallel.

Each generator, for example SD1i, supplies to the synchronization connection SYN two samples each including one bit at the timing rate of the cells supporting the virtual circuit corresponding to that generator.

The sequence NLS1 is a non-linear sequence because it is produced by a logic circuit NLF1 implementing a non-linear logic function. Because of this non-linearity, it is extremely difficult to determine the key Ki from a knowledge of part of the sequence NLS1, even if the non-linear function is known.

The sequences LS1i, etc are linear because they are produced by logic circuits that implement exclusively linear functions. These functions use linear operators, made up of exclusive-OR gates, for example. A linear function of this kind is not highly resistant to attempted fraudulent decryption, but makes it relatively easy to synchronize two devices that have to produce the same sequence simultaneously, one in the encryption device and the other in the decryption device.

The embodiment of the decryption device DD of the invention includes:

an input terminal 10 connected to the logical connection CT to receive an encrypted bit stream;

an input terminal 11 connected to the synchronization logical connection SYN to receive samples of the linear pseudo-random sequence NLS1;

an input-output terminal 12 connected to the logical connection KT to exchange key transfer messages with the encryption device CD;

an input terminal 18 connected to the connection KS to receive key change orders;

an input terminal 14 receiving the virtual circuit identifier VCI and the virtual path identifier VPI identifying the virtual circuit supported by the cell that is currently being transmitted and decrypted;

an input terminal 15 receiving the sequence number SN of this cell in this virtual circuit;

an input terminal 16 receiving the binary word BP indicating the position in this cell of the octet one bit of which is currently being transmitted and decrypted;

an output terminal 13 supplying a decrypted bit stream;

an exclusive-OR gate EXOR2 having a first input connected to the input terminal 10 to receive the encrypted bit stream, a second input receiving a non-linear pseudo-random binary sequence NLS2 that is identical to the sequence NLS1 and synchronized with the latter when synchronization is acquired and an output connected to the output terminal 13, this gate decrypting the encrypted bit stream bit by bit;

a logic circuit NLF2 identical to the logic circuit NLF1 and implementing the same non-linear logic function, this circuit including a first input receiving a linear pseudo-random sequence LS2i identical to the sequence LS1i when synchronization is acquired, a second input receiving the key Ki specific to the network unit that contains the decryption device DD concerned, a third input connected to the input terminal 16 to receive the word BP indicating the position of the octet one bit of which is currently being decrypted, a fourth input receiving a bit KNL which is the least significant bit in a key number designating the key Ki currently in use and an output supplying the non-linear pseudo-random sequence NLS2 bit by bit to the second input of the gate EXOR2;

a set KR of two registers each containing a key, one of which is the key Ki currently in use in the decryption device DD concerned, this set of registers having an output connected to the second input of the circuit NLF2 to supply one of the two keys stored in the set KR;

a synchronization device SD2 including a plurality of pseudo-random binary sequence generators each dedicated to one of the virtual circuits set up between the node TUAN and the network unit including this decryption device DD, in particular a generator SD2i supplying the sequence LS2i for the virtual circuit identified by VPI-VCI, this device SD2 having an input connected to the input terminal 11 to receive the pair of identifiers VPI-VCI, an input connected to the terminal 15 to receive the sequence number SN of the cell currently being decrypted and an output supplying the linear pseudo-random binary sequence LS2i to the first input of the logic circuit NLF2; and a controller DDC having: an input-output connected to the input-output terminal 12 for exchanging key change protocol messages with the controller CDC, an output connected to a control input of the key registers KR to supply to the latter a new value of the key when the decision is taken to renew the key of the network unit concerned and an output supplying the bit KNL to the fourth input of the circuit NLF2.

At all times the key Ki is different in each of the decryption devices in the respective different network units ONU1, . . . , ONU4. To maintain confidentiality even if the key specific to a unit has been discovered, the encryption key of each virtual circuit is changed periodically, for example every 15 minutes.

Every 15 minutes the controller CDC sends a message to all the decryption devices DD in the units ONU1, . . . , ONU4 to request each of them to supply a new key. This message contains a number designating the new set of keys to be created. At the same time, the controller CDC starts a repetition timer the duration of which corresponds to the maximum time needed for all of the units to respond. If any unit fails to respond within this time, the controller repeats the message to that unit.

If three successive attempts are unsuccessful, the controller CDC deems the unit to be defective and sends it a negative acknowledgement.

In the normal situation, when the controller DDC of each decryption device receives this message it draws a new key at random and sends it to the controller CDC, indicating the number of the new set of keys and protecting the key by means of an error detection code. It sends it in clear since the directional property of the passive optical network APON assures confidentiality of transmission in the unit-node direction. Each key is accompanied by a cyclic redundancy error detection code word.

If the key is received without error, the controller CDC sends a positive acknowledgement and writes the new key into the key memory KM at a location corresponding to the unit that sent the key and corresponding to the number of the set of keys. For the moment, this is a reserve key.

The controller DDC does not write the new key into a register KR immediately, because it must first be sure that it has been received by the encryption device CD. When it sends a new key, the controller DDC starts a timer the duration of which is greater than that of the repetition timer. If it does not receive any negative acknowledgement or any new message inviting it to supply the key, it concludes when the timer times out that the key it sent has been received. It then stores it in one of the two registers of the set KR, the one that corresponds to the number of the new set of keys. During this time, the key Ki currently being used for decryption is that stored in the other register of the set KR.

In each encrypted cell, the control octet containing service information specific to encryption and to decryption includes two bits for designating by means of a number the set of keys currently being used by the encryption device, two bits for a respective two synchronization samples and four bits for an error-detection code word. This error detection is important to avoid a transmission error causing an untimely change of key in the decryption device.

It is the controller CDC in the encryption device CD that decides to use the new set of keys available in the memory KM and in the set KR. The number of the set including the key used to encode a cell is transmitted in clear in that cell. This key number is common to all the keys of the set of keys currently being used for encryption, in other words for all the units ONU1, . . . , ONU4. The encryption keys are changed virtually simultaneously for all the virtual circuits set up. The keys used for decryption are not changed absolutely simultaneously for all the virtual circuits, since in each network unit the controller DDC does not change the decryption key until it has received a cell containing a new key number.

The use of the control octet to transmit synchronization samples regularly to the decryption device DD has the advantage of enabling not only fast acquisition of synchronization but also fast detection of loss of synchronization; it also enables the renewal of keys.

Separate generators SD1i and SD2i are provided for each virtual circuit set up between the node OAN and any network unit. This arrangement has the advantage that loss of synchronization affects only one virtual circuit at a time.

For example, each coupling device TUAN includes an encryption device CD comprising 44 generators SD1i, etc and each network unit ONU1, . . . , ONU4 includes ten generators SD2i, etc to enable each network unit to set up around ten virtual circuits with the coupling device TUAN.

The means supplying the identifiers VCI and VPI, the sequence number SN and the position BP in the coupling device TUAN and in each unit ONU1, . . . , ONU4 are conventional signalling means the implementation of which will be evident to the person skilled in the art.

Figure 3:
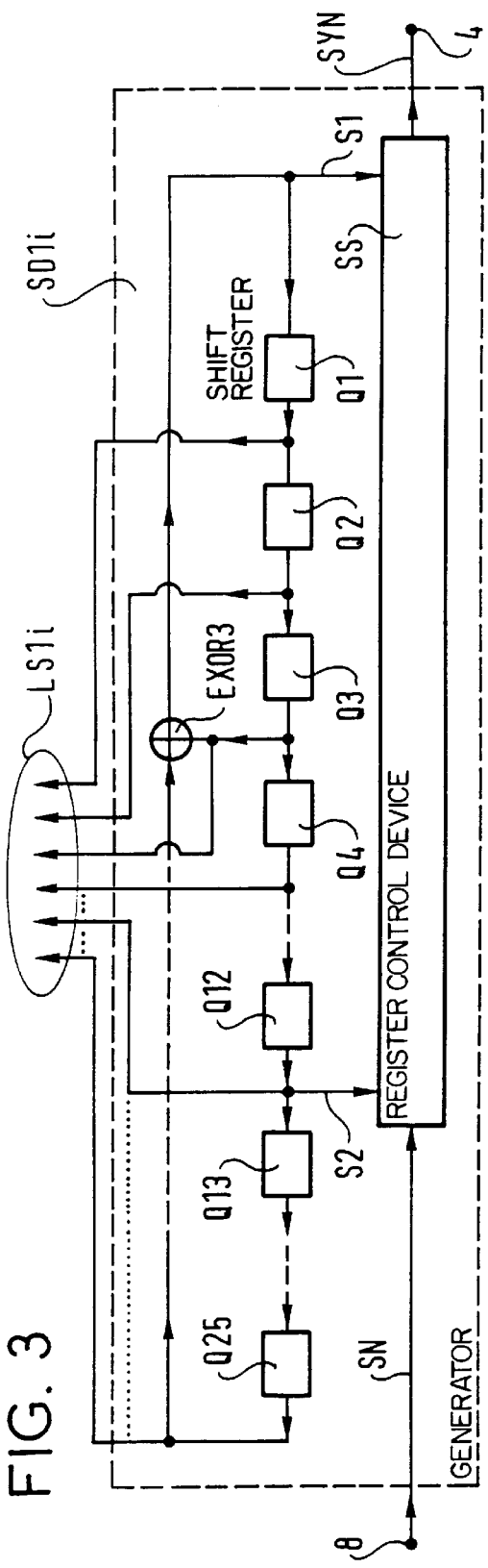
FIG. 3 shows the block diagram of part of this embodiment of the encryption device.

FIG. 3 shows the block diagram of one embodiment of the generator SD1i that is part of the synchronization device SD1 and corresponding to a virtual circuit identified by VPI-VCI.

This embodiment includes:

a shift register including 25 stages Q1, . . . , Q25, each stage having a data input, an output connected directly to the data input of the following stage and a control input, not shown, receiving a clock signal;

an output supplying a word on 25 bits in parallel, these 25 bits being consecutive bits of the linear sequence LS1i and being taken from the outputs of the respective 25 stages Q1, . . . , Q25;

an exclusive-OR gate EXOR3 having an input connected to the output of the stage Q25, an input connected to the output of the stage Q3 and an output connected to the data input of the first stage Q1 of the register; connected in this way, this gate constitutes a linear feedback loop for a generator polynomial $1+X^3+X^{25}$; and a device SS controlling the register Q1, . . . , Q25 and sending synchronization samples, including a first input connected to the output of the gate EXOR3 to sample a value S1 of the sequence LS1i, a second input connected to the output of the twelfth stage Q12 to sample a value S2 of the sequence LS1i, a third input connected to the input terminal 8 to receive the sequence number SN, an output, not shown, supplying a clock signal simultaneously to all of the stages Q1, . . . , Q25 each time that the sequence number SN is incremented by one unit and an output supplying the pair of samples S1, S2 to the output terminal 4 connected to the synchronization logical connection SYN.

When a new connection is set up, i.e. when a new pair of identifiers VPI-VCI is created, a new synchronization device SD1i is initialized from a fixed value defined by a hardwired device. At virtually the same time, a synchronization device SD2i is initialized at random. The device SD2i is synchronized subsequently from samples transmitted by the logical connection SYN. Each cell supporting the new connection includes the two samples S1 and S2 in its payload, in the control octet containing the service information specific to the encryption and decryption operations.

Since two samples each comprising one bit are transmitted in this way in each cell supporting the virtual circuit concerned, it is necessary to wait for exactly 13 cells to be transmitted before it is possible to reconstitute in the decryption device DD a sequence of 25 bits identical to the sequence produced at the same time by the synchronization device SD1i and thereafter to be able to have it operate autonomously by activating it at the rate of arrival of the cells.

Figure 4:
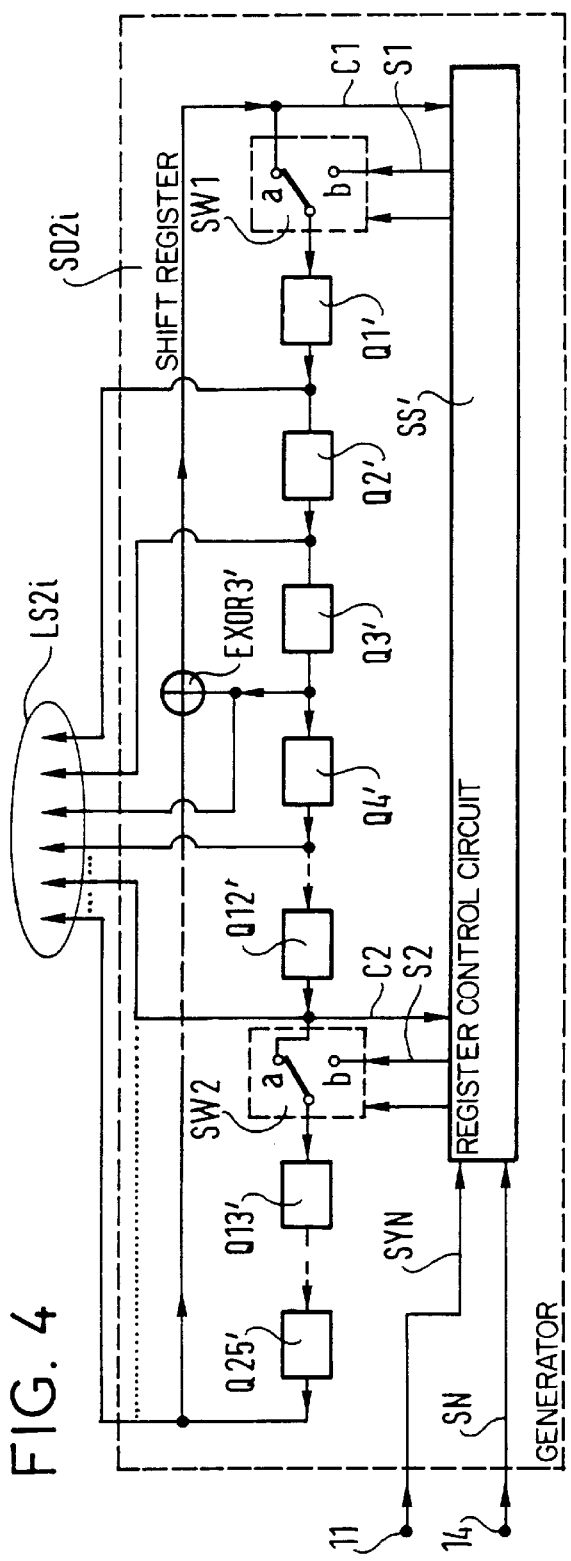
FIG. 4 shows the block diagram of part of this embodiment of the decryption device.

FIG. 4 shows the block diagram of one embodiment of the generator SD2i that is part of the synchronization device SD2. This embodiment includes:

a shift register including 25 stages Q1', . . . , Q25', each stage having a data input, a control input, not shown, and an output;

an exclusive-OR gate EXOR3' having an input connected to the output of the stage Q25', an input connected to the output of the stage Q3' and an output;

a logic circuit SW1 equivalent to a switch having two inputs a and b and one output, the input a being connected to the output of the gate EXOR3' and the output being connected to the data input of the first stage Q1';

a logic circuit SW2 equivalent to a switch with two inputs a and b and one output, the input a being connected to the output of the stage Q12' and the output being connected to the input of the stage Q13';

a circuit SS' controlling the register Q1', . . . , Q25' and synchronization, having an input connected to the input terminal 11 to receive the synchronization samples S1 and S2 transmitted over the logical connection SYN, an input connected to the input terminal 14 to receive the sequence number SN of each cell, an input connected to the output of the twelfth stage Q12' of the shift register to sample a sample C2 of the sequence LS2i, an input connected to the output of the gate EXOR3' to sample a sample C1 of the sequence LS2i, an output, not shown, supplying a clock signal simultaneously to the control inputs of all the register stages Q1', . . . , Q25' each time that the sequence number SN is incremented by one unit, an output connected to the input b of the circuit SW1 to supply to the latter the sample S1 sent by the encryption device CD, an output connected to the input b of the circuit SW2 to supply to the latter the sample S2 sent by the encryption device CD and two outputs connected to the control inputs of the circuits SW1 and SW2, respectively.

Throughout the synchronization phase, the circuit SS' controls the switching circuits SW1 and SW2 so that each connects its output to its input b. In this way the sample S1 is supplied to the first stage Q1' and the sample S2 is supplied to the thirteenth stage Q13'. After receiving thirteen consecutive valid cells for the virtual circuit concerned, 26 samples have been stored successively in the shift register Q1', . . . , Q25'. The sequence of 25 bits that it contains is then identical to the sequence contained in the shift register Q1, . . . , Q25 of the synchronization device SD1i in the encryption device CD. Thus synchronization has been acquired.

The circuit SS' then causes each switching device SW1 and SW2 to connect its input a to its output. The shift register Q1', . . . , Q5' and the gate EXOR3' are then looped exactly like the shift register Q1, . . . , Q25 and the gate EXOR3. The two shift registers are clocked at the rate at which the cells are transmitted and consequently continue to produce identical sequences LS1i and LS2i if there are no disturbances on the line likely to create errors in the transmission of the sequence number SN.

The samples S1 and S2 received are systematically compared by the circuit SS' with the values C1 and C2 sampled at the shift register Q1', . . . , Q25'. If the circuit SS' detects a number of errors greater than a fixed threshold value it concludes that the synchronization procedure must be started over and causes each of the switching circuits SW1 and SW2 to connect its input b to its output.

For each cell, the circuit SS' compares the sequence number SN of the cell with an expected sequence number SNe and with the expected sequence number plus one: SNe+1, in order to detect any loss of a cell:

If SN=SNe, the cell received is decrypted using the current state of the shift register Q1', . . . , Q25'. The circuit SS' checks the validity of the control octet containing the encryption and decryption information by checking the four bits of the error detection word contained in the control octet:

If the control octet is accepted, the circuit SS' compares the value of the samples S1 and S2 to the value of the samples C1 and C2 and it counts any discrepancies in an error counter.

If it does not detect more than one discrepancy between S1, S2 and C1, C2 in the last 13 control octets that have been accepted, it supplies a clock signal that commands a shift of one step in the shift register Q1', ..., Q25'. It then waits to receive the next cell, which will be decrypted using the new value of the sequence LS2i produced by this shift.

If it detects two or more discrepancies between S1, S2 and C1, C2 for the last 13 control octets it restarts the synchronization process, i.e. it causes each of the switching circuits SW1 and SW2 to connect its input b to its output. In this way the values of samples S1 and S2 can be introduced into the stages Q1 and Q13' to reinitialize the shift register totally after a time-delay corresponding to the reception of 13 cells carrying 13 new pairs of samples.

If the control octet is rejected because checking its four error detection bits gives a negative result, the error counter remains unchanged because the samples S1 and S2 cannot be used. The circuit SS' supplies a clock signal to shift the content of the shift register Q1', ..., Q25' by one step and then waits to receive the next cell.

If SN=SNe+1, this means that cell number SN=SNe has been lost. The circuit SS' commands a shift of one step in the shift register Q1', ..., Q25' and then the cell is decrypted using the new state of the shift register, after which the control octet is processed as in the situation in which SN=SNe.

If SN≠SNe and SN≠SNe+1, the circuit SS' reinitializes the counter supplying the expected sequence number SNe by loading into it the number value SN contained in the received cell; it then restarts the synchronization process.

Figure 5:
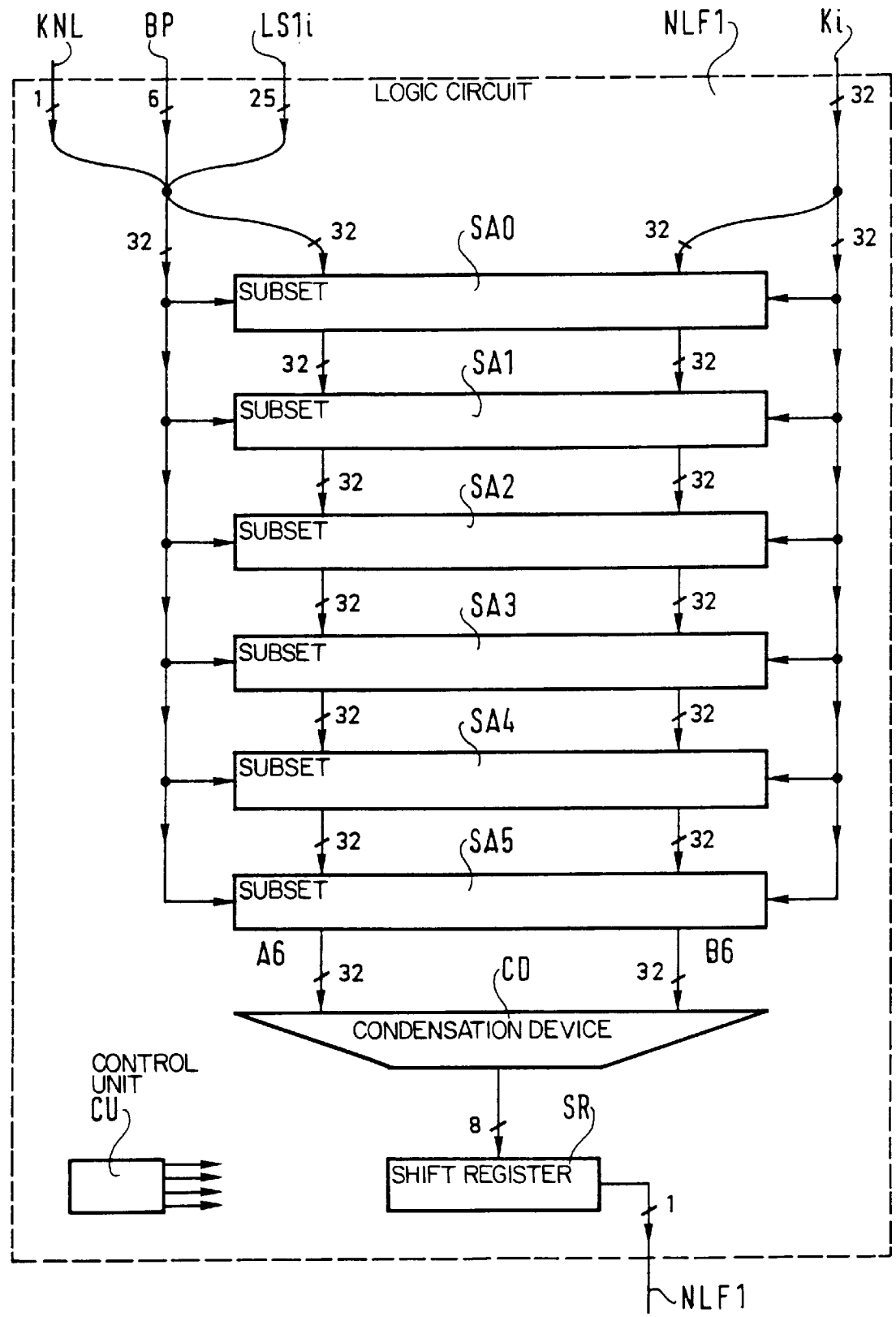
FIGS. 5 and 6 show the block diagram of one embodiment of a logic circuit for implementing a nonlinear encryption algorithm in the encryption device and in the decryption device of the invention.

FIG. 5 shows the block diagram of one embodiment of the logic circuit NLF1. This embodiment includes:

six subsets SA0, SA1, SA2, SA3, SA4, SA5 respectively corresponding to six successive calculation steps of the non-linear function to be applied, the three even subsets SA0, SA2, SA4 being identical to each other and the three odd subsets SA1, SA3, SA5 being identical to each other;

a condensation device CD having two inputs each receiving a 32-bit word and an output supplying a word on only eight bits, obtained by applying a conventional process of calculating a cyclic redundancy code word, for example by taking the remainder of a division by the polynomial $X^8+X^2+X+1$;

an 8-bit shift register SR having an input connected to the output of the condensation device CD to receive eight bits in parallel and an output from which the eight bits are output in serial form, to constitute the non-linear pseudo-random sequence NLS1; and a control unit CU supplying clock signals to all the subsets SA0, ..., SA5 and to the shift register SR via connections that are not shown.

Each subset SAj (j=0 through 5) includes:

a first input receiving a 32-bit binary word made up of the parallel combination of three binary words: the bit KNL which is the least significant bit of the key number, the binary word BP on six bits, which is the position of the octet to be encrypted in the cell that contains that octet, and a 25-bit binary word made up of 25 consecutive bits of the linear pseudo-random sequence LS1i supplied by the linear pseudo-random sequence generator circuit SD1i;

a second input receiving a 32-bit binary word comprising the key Ki;

a third input receiving a 32-bit binary word supplied by a first output of the (j−1)th subset (j≧1) made up of the combination of the binary words KNL, BP, LS1i for the subset SA0;

a fourth input receiving a 32-bit binary word supplied by a second output of the (j−1)th subset (j≧1) and which comprises the key Ki for the subset SA0; and two outputs each supplying 32 bits, the two outputs being connected to the third and fourth inputs of the (j+1)th subset (j=0 through 4), the two outputs of the subset SA5 being connected to the two inputs of the condensation device CD.

The control unit CU commands the loading of the register SR with eight bits in parallel at the timing rate of the octets to be encrypted and commands serial reading at the timing rate of the bits to be encrypted.

Figure 6:
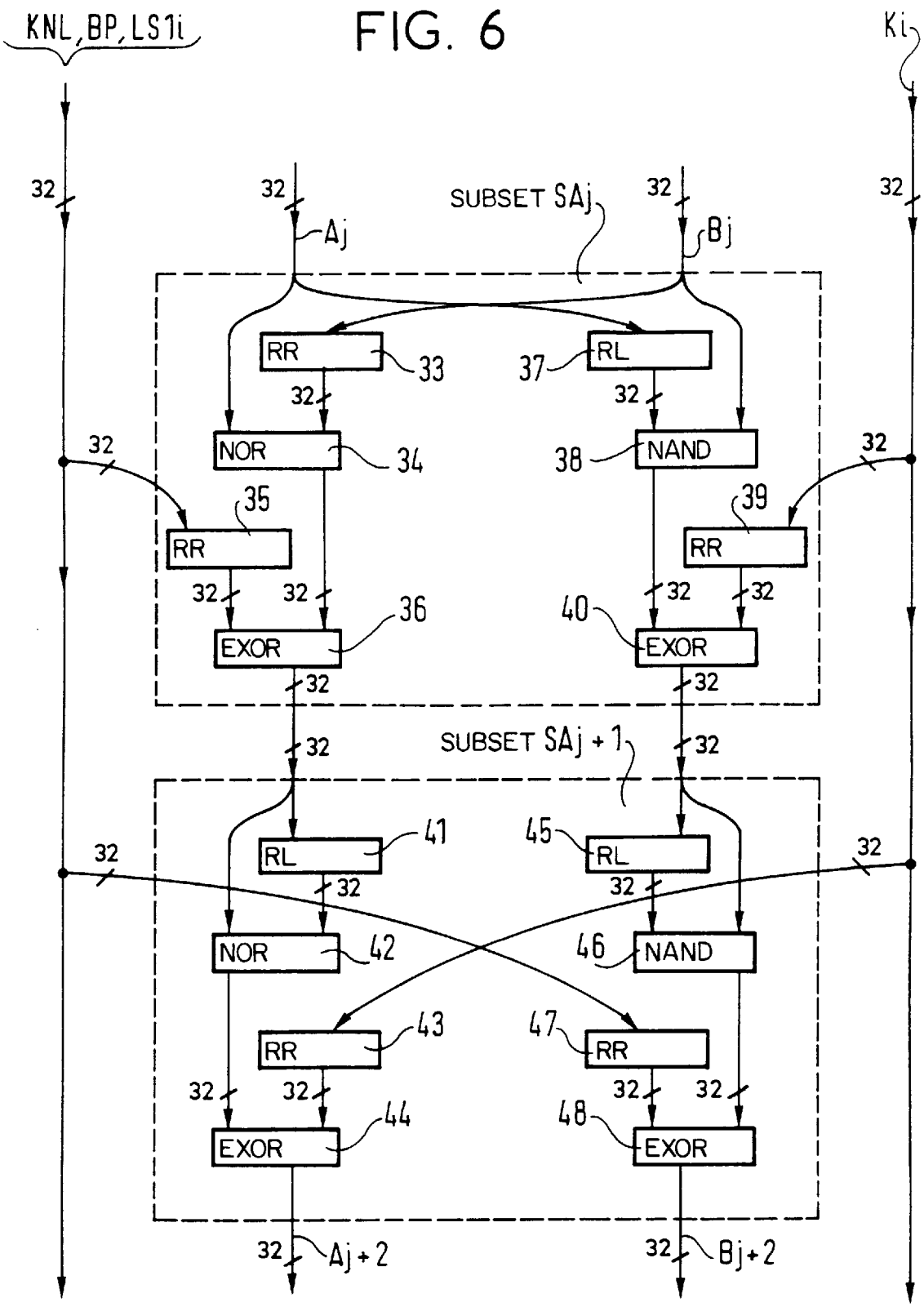

FIG. 6 shows the block diagram of two consecutive subsets SAj and SAj+1 for even values of j. The subset SAj includes:

a rightward rotation device 33 with a shift $\delta_j$ having an input connected to the fourth input of the subset SAj and an output supplying 32 bits;

a set of 32 NOR gates 34, each gate having an input connected to one bit at the output of the device 33, an input connected to one bit of the third input of the subset SAj and an output constituting one output bit of the set 34;

a rightward rotation device 35 for a shift $\delta_j+1$ having an input connected to the first input of the subset SAj to receive the 32 bits of the combination of the binary words KNL, BP, LS1i and an output on 32 bits;

a set of 32 exclusive-OR gates 36, each gate having an input connected to the output of a gate of the set 34, an input connected to one bit at the output of the rightward rotation device 35 and an output constituting one bit of the first output of the subset SAj;

a leftward rotation device 37 for a shift $\delta_j$ having an input connected to the third input of the subset SAj to receive the 32 bits of the combination of the binary words KNL, BP, LS1i and an output on 32 bits;

a set of 32 NAND gates 38, each gate having an input connected to one bit at the output of the leftward rotation device 37, an input connected to one bit at the fourth input of the subset SAj and an output constituting one output bit of the set 38;

a rightward rotation device 39 for a shift $\delta_j+1$ having an input constituting the second input of the subset SAj and receiving the 32 bits of the key Ki and an output on 32 bits;

a set of 32 exclusive-OR gates 40, each gate having an input connected to one bit at the output of the rightward rotation device 39, an input connected to the output of a gate of the set 38 and an output constituting one bit of the second output of the subset SAj.

The subset SAj+1 includes:

a leftward rotation device 41 for a shift $\delta_{j+1}+1$ having an input connected to the third input of the subset SAj+1 to receive a 32-bit binary word and an output on 32 bits;

a set of 32 NOR gates 42, each gate having an input connected to one bit at the third input of the subset SAj+1, an input connected to one bit at the output of the leftward rotation device 41 and an output constituting one output bit of the set 42;

a rightward rotation device 43 for a shift $\delta_{j+1}+1$ having an input connected to the second input of the subset SAj+1 to receive the 32-bit binary word of the key Ki and an output on 32 bits;

a set of 32 exclusive-OR gates 44, each gate having an input connected to one bit at the output of the set 42, an input connected to one bit at the output of the rightward rotation device 43 and an output constituting one bit at the first output of the subset SAj+1;

a leftward rotation device 45 for a shift $S_{j+1}$ having an input connected to the fourth input of the subset SAj+1 to receive the 32-bit word and an output on 32 bits;

a set of 32 NAND gates 46, each gate having an input connected to one bit at the fourth input of the subset SAj+1, an input connected to one bit at the output of the leftward rotation device 45 and an output constituting one output bit of the set 46;

a rightward rotation device 47 for a shift $\delta_{j+1}+1$ having an input connected to the third input of the subset SAj+1 to receive the 32-bit binary word consisting of the combination of the binary words KNL, BP and LS1i and an output on 32 bits; and a set of 32 exclusive-OR gates 48, each gate having an input connected to one output bit of the set 46, an input connected to one output bit of the rightward rotation device 47 and an output constituting one bit of the second output of the subset SAj+1.

In this embodiment:

The value $\delta_0$ is equal to 0.

The value $\delta_j$ is equal to $2^{j-1}$ for $j \geq 1$.

The rightward shift devices 35, 39, 43, 47, the leftward shift devices 33, 37, 41, 45 and the condensation device CD carry out operations that are virtually irreversible. It is therefore very difficult for a "pirate" to find the key knowing a part, even a large part, of the data sequence in clear. The implementation of each gate, of each rightward or leftward shift logic circuit and of the condensation device CD are entirely conventional.

There is claimed:

1. An encryption device for encrypting information units conveyed by asynchronous transfer mode cells, for use in in an optical distribution network including an optical access node, a directional passive optical network and a plurality of network units, coupling means conveying to said optical access node only any cell sent by a network unit, cells being broadcast from a node to network units, each cell conveying at least one information unit, each information unit being addressed to a single network unit;

said encryption device being located in said optical access node and including:

means for calculating an encrypted value for each bit of each information unit to be encrypted, in accordance with a respective bit of a first pseudo-random sequence; and means for supplying said first pseudo-random sequence, in accordance with a key value specific to the network unit to which the information unit is addressed;

wherein the means for supplying said first pseudo-random sequence include:

means for calculating said first pseudo-random sequence using an algorithm, in accordance with a key value; and means for receiving in clear at least one said key from at least one decryption device in a network unit.

2. The encryption device claimed in claim 1, for composite cells each conveying a plurality of information units respectively addressed to a plurality of subscriber terminals that are separate but connected to the same network unit, wherein said first pseudo-random sequence is further determined in accordance with the position of said information unit in the cell which conveys it after encryption.

3. The encryption device claimed in claim 1 wherein said first pseudo-random sequence is also calculated in accordance with a second pseudo-random sequence constituting a synchronization sequence and said means for supplying said first pseudo-random sequence further include synchronization means for supplying said second pseudo-random binary sequence and for transmitting samples of said sequence to at least one decryption device in order to synchronize it.

4. The encryption device claimed in claim 3 wherein said means for supplying a second pseudo-random sequence supply a second sequence that is independent for each virtual circuit set up between said node and a network unit and supply said sequence at a timing rate corresponding to the rate at which cells are sent on the virtual circuit concerned.

5. The encryption device claimed in claim 3 wherein said means for supplying a second pseudo-random sequence include a shift register looped by a logic circuit implementing a linear function and the samples supplied comprise the value contained in at least one of the stages of said shift register.

6. An encryption device as claimed in claim 1 further including means for:

memorizing a plurality of keys, deciding to change key, and inserting into each cell information indicating which key was used to encrypt the information units conveyed by that cell.

7. The encryption device claimed in claim 1, wherein said algorithm is non-linear.

8. A decryption device for decrypting information units conveyed by asynchronous transfer mode cells, for use in in a directional passive optical network including an optical access node, a plurality of network units and coupling means broadcasting from said node to said network units any cell transmitted by said node and conveying to said node only any cell transmitted by a network unit, each cell conveying at least one information unit and each information unit being addressed to a single network unit;

said decryption device being located in a network unit and including:

means for calculating a decrypted value for each bit of each information unit to be decrypted, in accordance with a respective bit of a first pseudo-random sequence; and means for supplying said first pseudo-random sequence according to the network unit that includes said decryption device;

wherein said means for supplying said first pseudo-random sequence include:

means for calculating said first pseudo-random sequence using an algorithm and in accordance with a key value; and means for supplying said key value and for sending it in clear to an encryption device located in said optical access node.

9. The decryption device claimed in claim 8 for composite cells each conveying a plurality of information units addressed to a respective plurality of subscriber terminals that are separate but connected to the same network unit, wherein said first pseudo-random sequence is further determined in accordance with the position of said information unit in the cell which conveys it to said decryption device.

10. The decryption device claimed in claim 8 wherein said first pseudo-random sequence is also calculated in accordance with a second pseudo-random sequence constituting a synchronization sequence and said means for supplying said first pseudo-random sequence further include synchronization means for supplying said second pseudo-random binary sequence and for synchronizing said sequence on the basis of samples of said sequence supplied by an encryption device.

11. The decryption device claimed in claim 10 wherein said means for supplying a second pseudo-random sequence supply a second sequence that is independent for each virtual circuit set up between said node and a network unit and supply said sequence at a timing rate corresponding to the rate at which cells are received on the virtual circuit concerned.

12. The decryption device claimed in claim 10 wherein said means for supplying a second pseudo-random sequence include a shift register looped by a logic circuit implementing a linear function and samples supplied by said encryption device are loaded into at least one stage of said shift register to synchronize it.

13. A decryption device as claimed in claim 8 further including:
    memory means for memorizing a plurality of keys;
    means for receiving information conveyed in each encrypted cell and indicating what key was used to encrypt the information units conveyed by said cell; and
    means for reading in said memory means the key that is indicated by the information conveyed in a cell and supplying it to said means for supplying said first pseudo-random sequence.

14. The decryption device claimed in claim 8, wherein said algorithm is non-linear.

* * * * *